United States Patent
Heise et al.

(10) Patent No.: US 8,543,305 B2
(45) Date of Patent: Sep. 24, 2013

(54) METHOD AND DEVICE FOR ASSESSING THE COMPATABILITY OF BRAKING SYSTEMS OF A VEHICLE COMBINATION

(75) Inventors: Bernd Heise, Hannover (DE); Hans Holst, Seelze/Velber (DE); Udo Ronnenberg, Wedemark (DE); Axel Stender, Hameln (DE); Norbert Witte, Lauenau (DE)

(73) Assignee: WABCO GmbH, Hannover (DE)

( * ) Notice: Subject to any disclaimer, the term of this patent is extended or adjusted under 35 U.S.C. 154(b) by 618 days.

(21) Appl. No.: 12/451,686

(22) PCT Filed: May 9, 2008

(86) PCT No.: PCT/EP2008/003765
§ 371 (c)(1),
(2), (4) Date: Apr. 28, 2010

(87) PCT Pub. No.: WO2008/141740
PCT Pub. Date: Nov. 27, 2008

(65) Prior Publication Data
US 2010/0217495 A1    Aug. 26, 2010

(30) Foreign Application Priority Data
May 24, 2007   (DE) .......................... 10 2007 024 310

(51) Int. Cl.
*B60T 17/18*   (2006.01)
*B60T 8/17*    (2006.01)

(52) U.S. Cl.
USPC ................................................ 701/70; 303/7

(58) Field of Classification Search
USPC ................. 701/70, 71, 78, 81, 83, 91; 303/7, 303/8
See application file for complete search history.

(56) References Cited

U.S. PATENT DOCUMENTS

| | | | | | |
|---|---|---|---|---|---|
| 3,899,216 | A | * | 8/1975 | Putman | 303/127 |
| 3,938,538 | A | * | 2/1976 | Putman et al. | 137/39 |
| 4,712,839 | A | * | 12/1987 | Brearley et al. | 303/3 |
| 4,804,237 | A | * | 2/1989 | Gee et al. | 303/7 |
| 5,002,343 | A | * | 3/1991 | Brearley et al. | 303/7 |
| 5,132,664 | A | * | 7/1992 | Feldmann et al. | 340/453 |

(Continued)

FOREIGN PATENT DOCUMENTS

| | | | |
|---|---|---|---|
| DE | 42 43 245 A1 | 6/1994 | |
| DE | 44 46 358 C1 | 12/1995 | |

(Continued)

OTHER PUBLICATIONS

WABCO Publication, "Braking deceleration and projection", Basic Training Compressed Air Brake System, Chapter 23, downloaded from http://inform.wabco-auto.com/intl/pdf/815/00/57/8150100573-23.pdf, date unknown.*

(Continued)

*Primary Examiner* — James Trammell
*Assistant Examiner* — David Testardi
(74) *Attorney, Agent, or Firm* — Kramer Levin Naftalis & Frankel LLP

(57) ABSTRACT

A method and a device for assessing the compatibility of braking systems of a vehicle combination comprising a tractor and a trailer determine applied braking power ($W_a$) for a braking process of the trailer, and a required braking power for the braking process ($W_b$) of the trailer.

16 Claims, 2 Drawing Sheets

(56) References Cited

U.S. PATENT DOCUMENTS

| | | | |
|---|---|---|---|
| 5,141,292 A * | 8/1992 | Gardell et al. | 303/7 |
| 5,312,168 A * | 5/1994 | Breen | 303/9.61 |
| 5,375,452 A * | 12/1994 | Helldorfer et al. | 73/9 |
| 5,390,990 A * | 2/1995 | Cook et al. | 303/132 |
| 5,403,073 A * | 4/1995 | Frank et al. | 303/7 |
| 5,409,301 A * | 4/1995 | Topfer et al. | 303/7 |
| 5,549,364 A * | 8/1996 | Mayr-Frohlich et al. | 303/9.69 |
| 5,588,716 A * | 12/1996 | Stumpe | 303/7 |
| 5,662,389 A * | 9/1997 | Truglio et al. | 303/7 |
| 5,833,325 A * | 11/1998 | Hart | 303/7 |
| 5,992,579 A * | 11/1999 | Kyrtsos | 188/79.52 |
| 6,079,791 A * | 6/2000 | Stumpe et al. | 303/7 |
| 6,099,085 A * | 8/2000 | Eckert | 303/3 |
| 6,109,702 A * | 8/2000 | Horn et al. | 303/7 |
| 6,139,118 A * | 10/2000 | Hurst et al. | 303/7 |
| 6,312,065 B1 * | 11/2001 | Freitag et al. | 303/187 |
| 6,324,461 B1 * | 11/2001 | Yamaguchi et al. | 701/80 |
| 6,739,675 B1 * | 5/2004 | Scharpf et al. | 303/7 |
| 6,913,328 B2 * | 7/2005 | Eckert et al. | 303/191 |
| 7,134,733 B2 * | 11/2006 | Eckert et al. | 303/123 |
| 7,204,564 B2 * | 4/2007 | Brown et al. | 303/7 |
| 7,244,003 B2 * | 7/2007 | Larson | 303/191 |
| 7,317,975 B2 * | 1/2008 | Woolford et al. | 701/29.3 |
| 7,404,316 B2 * | 7/2008 | Svensson | 73/121 |
| 2005/0085950 A1 * | 4/2005 | Altenkirch | 701/1 |

FOREIGN PATENT DOCUMENTS

| | | |
|---|---|---|
| DE | 195 19 768 A1 | 12/1996 |
| EP | 0 303 827 | 2/1989 |
| EP | 1 359 076 A1 | 11/2003 |
| WO | WO 2005/058665 A1 | 6/2005 |

OTHER PUBLICATIONS

Puhn, Fred, "Brake Handbook", HP Books, Tucson, AZ, 1985, pp. 7 to 14.*

Centric Parts White Paper, "The Physics of Braking Systems" by James Walker, Apr. 27, 2005 (Google date), 7 pages, downloaded from http://www.centricparts.com/files/Centric%20White%20Paper%20A1-The%20Physics%20of%20Braking%20Systems.pdf.*

Chen, Chieh et al., "Modeling and control of articulated vehicles", California PATH Research Report, UCB-ITS-PRR-97-42, University of California, Berkeley, Nov. 1997, 60 pages.*

2002 Hayes Brake LLC Off Highway Catalog, Jan. 31, 2002 (Google date), pp. 2, 3, 32, 33, downloaded from http://www.hbperformance.com/pdf/2002-HayesBrakeCatalog.pdf.*

Aleksendric, D., "Intelligent Control of Commercial Vehicles Braking System Function", appearing in FISITA 2006 World Automotive Congress, Student Paper F2006-SC-032, Oct. 22-27, 2006, Yokohama, Japan, 8 pages.*

WABCO Publication, "Vehicle regulations 2004: ECE R.13", Jan. 26, 2004, pp. 233-510, downloaded from http://inform.wabco-auto.com/intl/pdf/815/000/051/815_051t2.pdf.*

WABCO Publication, "Braking deceleration and projection", Basic Training Compressed Air Brake System, Aug. 23, 2004, Chapter 23, downloaded from http://inform.wabco-auto.com/intl/pdf/815/00/57/8150100573-23.pdf.*

* cited by examiner

METHOD AND DEVICE FOR ASSESSING THE COMPATABILITY OF BRAKING SYSTEMS OF A VEHICLE COMBINATION

FIELD OF THE INVENTION

The present invention generally relates to a method and a device for assessing the compatibility of braking systems of a vehicle combination that has a towing vehicle and a trailer vehicle.

BACKGROUND OF THE INVENTION

In a vehicle combination, it is desired that when there is a braking process that is triggered in the towing vehicle by the driver, the trailer vehicle should apply the same deceleration as the towing vehicle. That is, if the trailer vehicle were not connected to the towing vehicle, it should nevertheless experience the same deceleration as the towing vehicle. This is intended to avoid the generation of undesirably large coupling forces in the coupling between the towing vehicle and the trailer vehicle. In addition, non-uniform wear of the brake linings of the two vehicles is to be avoided. In order to assess the compatibility of the braking systems of the towing vehicle and of the trailer vehicle, hitherto measurements have been performed on the vehicle combination on a brake test bench and, if appropriate, the braking systems have been adjusted by suitable adjustment measures to the braking systems.

The measurement of the braking systems of the towing vehicle and of the trailer vehicle on a brake test bench is relatively time-consuming and expensive.

SUMMARY OF THE INVENTION

Generally speaking, it is therefore an object of the present invention to make available a simple and cost-effective method and a device for assessing the compatibility of the braking systems of a towing vehicle and of a trailer vehicle.

This object is achieved by embodiments of the present invention, including a method for assessing the compatibility of braking systems of a vehicle combination, wherein the vehicle combination has a towing vehicle and a trailer vehicle, wherein an applied amount of braking energy of a braking process of the trailer vehicle is determined and a required amount of braking energy of the braking process of the trailer vehicle is determined. The applied amount of braking energy of the trailer vehicle is the amount of braking energy that is actually applied for the braking process in the braking system and wheels of the trailer vehicle. The required amount of braking energy of the trailer vehicle is to be understood as meaning the braking energy that is theoretically necessary for the braking process for braking the trailer vehicle. The applied and required amounts of braking energy can be determined, for example, by means of a control device in the vehicle combination through the evaluation of measurement variables, and can be stored in the control device. Depending on requirements, the control device can be provided in the towing vehicle or in the trailer vehicle. It is also possible to provide a control device in each of the vehicles.

The embodiments of the present invention also encompass a device operable to assess the compatibility of the braking systems of the vehicle combination by determining the applied amount of braking energy of the braking process of the trailer vehicle and the required amount of braking energy of the braking process of the trailer vehicle.

The embodiments of the present invention offer the advantage of permitting the compatibility of the braking systems of a towing vehicle and of a trailer vehicle to be assessed only by using a control device, for example the EBS control device, provided in the trailer vehicle in any case, without a brake test bench being required. All that is necessary is to expand the functionality of the control device, for example by expanding the software. The assessment of the compatibility can then be carried out in the normal driving mode.

The embodiments of the present invention offer the further advantage of permitting information to be obtained about the compatibility of the braking systems of the towing vehicle and of the trailer vehicle with respect to one another after only a brief period of operation in the driving mode of the vehicle combination. If appropriate, this can also be carried out during the ongoing operation of the vehicle by remote diagnosis, for example by means of a telematics interface. As a result, inadequate adjustment of the braking systems can be detected early, in particular before extensive damage occurs due to overheating or excessive wear of the braking system, and maintenance of the vehicle combination and improvement of the adjustment of the braking systems can therefore be initiated early.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Exemplary embodiments of the present invention are explained in greater detail below, including with reference to the accompanying drawing figures, in which.

DETAILED DESCRIPTION OF THE PREFERRED EMBODIMENTS

Figure 1:
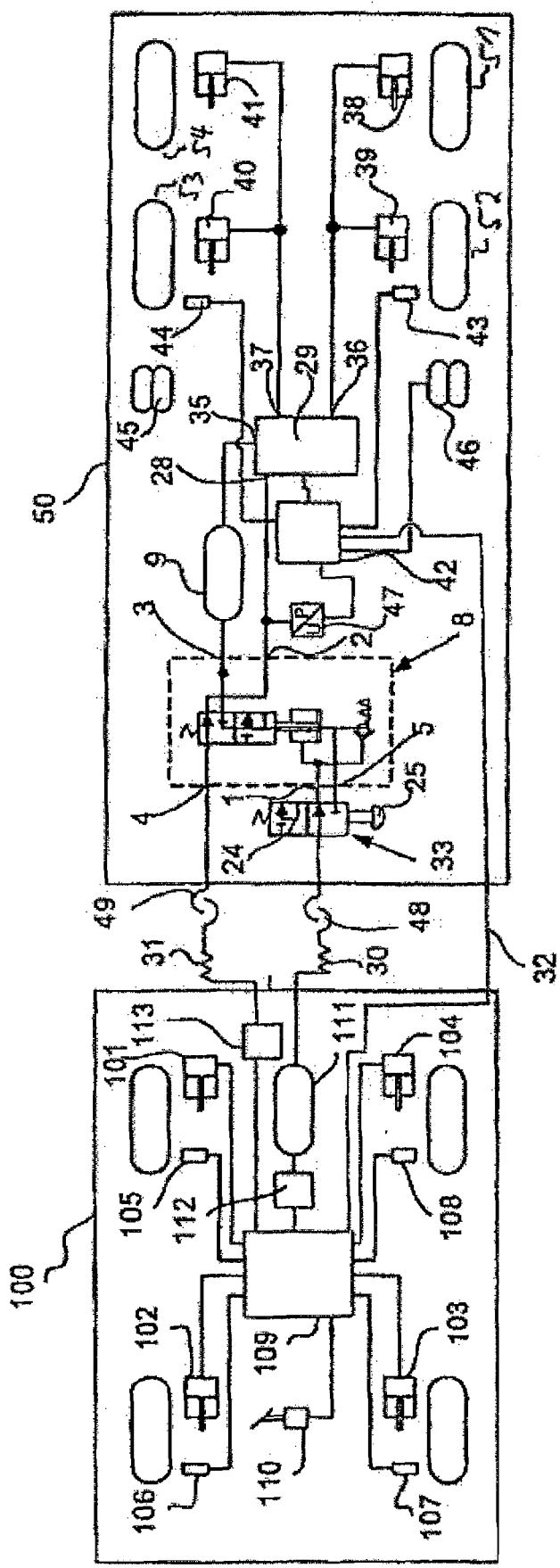
FIG. 1 shows braking systems of a vehicle combination having a towing vehicle and a trailer vehicle.

In accordance with embodiments of the present invention, a method for assessing the compatibility of braking systems of a vehicle combination includes determining both the applied amount of braking energy of the braking process of the trailer vehicle and the required amount of braking energy of the braking process of the trailer vehicle. The applied and required amounts of braking energy can be determined, for example, utilizing a control device in the vehicle combination through the evaluation of measurement variables, and can be stored in the control device (and can be read out via an interface). The control device can be provided in the towing vehicle or in the trailer vehicle, or in each of the vehicles.

In one embodiment of the present invention, a variable (G) for assessing the compatibility is determined as a function of the applied amount of braking energy and as a function of the required amount of braking energy. The determination of the variable can be carried out in the control device.

In another embodiment, the variable is determined as a function of a quotient formed from the applied amount of braking energy and the required amount of braking energy. This refinement makes available a particularly informative variable for assessing the compatibility. If the variable is less than 1, the trailer vehicle is underbraked since the amount of braking energy that is actually applied is less than the theoretically required amount of braking energy. If the variable is greater than 1, the trailer vehicle is therefore overbraked since the amount of braking energy that is actually applied is greater than the amount of braking energy that is theoretically required. In an ideal case, the variable assumes the value one.

In a further embodiment, the applied amount of braking energy is determined as a function of at least one wheel circumferential speed of a wheel of the trailer vehicle and as a function of at least one brake cylinder pressure of a brake cylinder of the trailer vehicle. The wheel circumferential speed refers to the wheel circumferential speed of a wheel of the trailer vehicle that is braked by means of the brake cylinder. The wheel circumferential speed can be determined, for example, by means of ABS sensors. The pressure in the brake cylinder can be determined, for example, by means of a pressure sensor that is assigned to a modulator that controls the brake cylinder.

The applied amount of braking energy can be determined by the formula:

$$W_{aj} = k \cdot T \cdot \sum_{i=1}^{n} (p_{Bji} - p_{AN}) \cdot v_{Rji}$$

where $W_{aj}$ denotes the applied amount of braking energy by a brake cylinder of the trailer vehicle and the applied amount of braking energy by a wheel braked by means of the brake cylinder; k denotes a constant; T denotes a sampling time of the control device in the vehicle combination; $p_{Bji}$ denotes the pressure prevailing in the brake cylinder; $p_{AN}$ denotes an application pressure; and $v_{Rji}$ denotes a wheel circumferential speed of the wheel braked by the brake cylinder. $v_{Rji}$ refers to the wheel circumferential speed of the wheel of the trailer vehicle braked by means of the brake cylinder. The application pressure is the pressure that is necessary in the brake cylinder to apply the brake linings to a disk or drum without contact occurring between the brake linings and the disk or drum. It is usually approximately 0.5 bar.

In the formula above, j and i denote indices. The index j is the index for the respective brake cylinder, and the wheel that is braked by the brake cylinder. The index i indicates the associated sampling time period of the sampling time T of the control device for the determination of $p_{Bji}$ and $v_{Rji}$. The brake pressure $p_{Bji}$ and the wheel circumferential speed $v_{Rji}$ are determined for each sampling time period occurring during the braking process. The duration of the sampling time period corresponds to the duration of the sampling time T. The sampling time period may be, for example, one ms. Therefore, in this example, for a braking process that lasts 2 s, 2000 sampling time periods therefore occur during the braking process, and in the formula above n assumes the value 2000.

A trailer vehicle usually has a plurality of brake cylinders. In order to determine the applied amount of braking energy, the applied amounts of braking energy $W_{aj}$ of all the brake cylinders and the associated wheels are summed.

The constant k is dependent on the design of the braking system of the trailer vehicle. For a commonly used design, k can be determined by the formula:

$$k = \frac{m_{AbB} \cdot 0.55 \cdot g}{p_{max} - p_{AN}},$$

where $m_{AbB}$ denotes the mass to be braked by a brake cylinder of the trailer vehicle when the trailer vehicle is fully laden; g denotes the gravitational constant; $p_{AN}$ denotes the application pressure; and $p_{max}$ denotes the pressure in a brake cylinder given a control pressure of 6.5 bar.

The required amount of braking energy can be determined by the formula:

$$W_b = \frac{m_A \cdot (v_{A1} - v_{An})^2}{2}$$

where $W_b$ denotes the required amount of braking energy; $m_A$ denotes the mass of the trailer vehicle; $v_{A1}$ denotes the speed of the trailer vehicle at the start of the braking process; and $v_{An}$ denotes the speed of the trailer vehicle after the end of the braking process.

According to an embodiment of the present invention, the variable (G) is determined on the basis of the applied amounts of braking energy that are determined for a plurality of braking processes, and the required amounts of braking energy that are determined for the plurality of braking processes. The values for the amounts of braking energy determined in the individual braking processes can, for this purpose, be stored, for example, in a memory of the control device. This permits statistical analysis of the sensed and stored values, which has the advantage that more informative and more accurate results can be determined for the variable. The influence of an individual braking process on the variable is reduced by this development.

In one advantageous embodiment of the present invention, the variable is output. The output can occur, for example, visually or audibly. The visual representation of the variable can occur, for example, on a display that is provided in the dashboard of the vehicle combination. Also, a warning lamp can automatically switch on when variables are determined that are outside a desired value range. A further possible way of representing the variable visually is to connect a diagnostic device to the control device and to read out the variable and display it.

Various procedures can be used to determine the applied amount of braking energy, the required amount of braking energy and/or the variable. In a first embodiment, the determination and storage of the applied amount of braking energy, the required amount of braking energy and/or the variable can take place autonomously in the control device in the vehicle combination. In a second embodiment, only the brake cylinder pressures, wheel circumferential speeds and speeds of the trailer vehicle occurring during braking processes are determined in the control device in the vehicle combination. The brake cylinder pressures, wheel circumferential speeds and speeds are then read out as required by means of a diagnostic device or a laptop, for example during a visit to a workshop or at the premises of a forwarding agent, and are then processed in the diagnostic device or the laptop such that the applied amount of braking energy, the required amount of braking energy and/or the variable are calculated and represented visually.

According to a further advantageous embodiment, the applied amount of braking energy and the required amount of braking energy and/or the variable are transmitted to a receiver unit by means of a telematics interface. The transmission can be carried out, for example, during the normal driving mode of the vehicle combination via a wireless data connection. The receiver unit can, for example, be a server that is connected to the Internet. The transmitted data can then be evaluated, for example, by a computer that is connected to the Internet and that accesses the data stored on the server.

As is apparent from the foregoing, the determination of the variable can advantageously be carried out at different locations.

In another embodiment, the applied amount of braking energy and the required amount of braking energy and/or the variable are determined during the normal driving mode of the vehicle combination. Normal driving mode is to be understood here as meaning the mode of the vehicle combination on a road. A brake test bench is therefore not required for the determination.

In a further embodiment, the applied amount of braking energy and the required amount of braking energy and/or the variable are determined automatically. The automatic determination can be carried out, for example, in the control device in the vehicle combination.

According to another embodiment, a braking process that takes place on a roadway with a longitudinal inclination exceeding a specific limiting value is not taken into account for the determination of the variable (G). As a result, the influence of the positive or negative gradient of the roadway on the determination of the variable is avoided. The occurrence of such a longitudinal inclination of the roadway can be detected, for example, by a satellite navigation system that is provided in the vehicle combination and in which information about the longitudinal inclination of the roadway is stored.

The braking process that takes place on a roadway with a longitudinal inclination exceeding a specific limiting value is advantageously detected by a speed gradient that is sensed before the braking process. The speed gradient can be determined, for example, by means of ABS sensors (sensors 43, 44, 105-108 in FIG. 1) in the vehicle combination.

According to a further embodiment, the braking systems of the vehicle combination can be adjusted as a function of the variable. It is therefore possible, for example, for brake pressures and/or pressure leads on valves of the vehicle combination to be changed as a function of the variable.

Referring to the drawing figures, FIG. 1 is a schematic illustration of braking systems of a towing vehicle 100 and of a trailer vehicle 50.

The illustration of the braking system of the trailer vehicle 50 is based on the refinement of a basic variant for trailer vehicles equipped with an EBS and including a towing vehicle 100 that is equipped as a semi-trailer and has two axles, this is a 2S/2M system (two ABS sensors for two wheels and two modulator channels for the wheel brakes of the left and right sides); the ABS brake pressure control operation is therefore carried out on a side basis.

The trailer vehicle 50 is connected pneumatically to the towing vehicle 100 via two pressure hoses, specifically via a supply pressure hose 30 for transmitting the supply pressure (pressure hose that is attached to the towing vehicle 100 and is coupled via the coupling head 48 of the trailer vehicle 50) and via a brake pressure hose 31 for transmitting the brake pressure (pressure hose that is attached to the towing vehicle 100 and is coupled via the coupling head 49 of the trailer vehicle 50). Both pressure hoses are connected pneumatically to a trailer control valve 113 on the side of the towing vehicle 100.

On the side of the trailer vehicle 50, the supply pressure hose 30 is connected pneumatically to a supply port 1 of a safety valve 8 via an optional release valve 33 (discussed below). The brake pressure hose 31 is connected via a pneumatic line to a brake-predefining port 4 of the safety valve 8. The safety valve 8 also has a vessel port 3 to which the supply pressure vessel 9 for the trailer vehicle 50 is connected, and a brake pressure port 2 at which the pneumatic brake pressure is output to the pneumatic inlet 28 of a pneumatic brake pressure modulator 29; this brake pressure constitutes the pneumatic control pressure for the trailer vehicle 50 with its electronic brake pressure control system.

The release valve 33 serves, by deactivating the automatic braking by means of the safety valve 8, to move a trailer vehicle 50 that has been decoupled from the towing vehicle 100. This is done by virtue of the fact that, in a release position, which can be adjusted manually by means of an activation knob 25, the pressure of the vessel 9 is deflected and fed into the safety valve 8 at the supply port 1 (from the release port 5 via the pressure duct 24 to the supply port 1 in FIG. 1); this pressure deflection simulates, in the safety valve 8, the fact that pressure is applied to the coupling head for the supply pressure hose.

In the case of the trailer vehicle 50 with the electronic brake pressure control system, a corresponding pneumatic control pressure is modulated at the brake pressure port 2 in all conceivable cases in which braking is to take place. This applies in normal braking processes since the trailer vehicle 50 must, of course, be capable of being coupled to any type of respectively permitted towing vehicle 100, both in the event of the towing vehicle 100 having an electronic brake control system and in the event of the towing vehicle 100 being equipped with a conventional pneumatic braking system. In the case of a towing vehicle 100 with an electronic brake control system, a braking process is initiated by activating the brake value signal transmitter associated with the control system, while in the case of a conventional towing vehicle 100 this is carried out by activating the corresponding motor vehicle braking valve.

In the case of a towing vehicle 100 with an electronic brake control system, in which towing vehicle 100 the brake pressure that has been set by the electronic trailer vehicle brake control system is determined in a normal situation by the electronic brake request signal transmitted from the towing vehicle 100 to the trailer vehicle 50 via an electrical interface 32 (e.g., ISO 7638/CAN), in the event of a fault the pneumatic control pressure is used to perform braking in the trailer vehicle 50 if the towing vehicle electronics have actually failed. If a conventionally braked towing vehicle 100 is used, the pneumatic control pressure in the trailer vehicle 50 generally serves to brake the trailer vehicle 50, since such a towing vehicle 100 cannot trigger the electronic brake pressure control system in the trailer vehicle 50. The conversion of the pneumatic brake signal into an electronic signal is carried out by means of a pressure sensor 47 in the trailer vehicle 50.

Apart from these normal braking processes, the safety valve 8 also applies a full brake pressure to the brake pressure modulator 29 that permits purely pneumatic braking without intervention by the electronics. If one of the two pneumatic lines between the towing vehicle 100 and the trailer vehicle 50 is torn off or if a coupling head 48 is not coupled, forced braking is triggered by means of the vessel pressure in a known fashion through the interaction between the trailer control valve 113 in the towing vehicle 100 and the safety valve 8, by virtue of the fact that, as explained below, in this case the vessel port 3 is pneumatically connected to the brake pressure port 2 in the safety valve 8.

To summarize, in all cases in which it is necessary to brake the trailer vehicle 50, whether with a normal braking operation or forced braking, a pressure, either the pneumatic control pressure or the vessel pressure, which is fed to the pneumatic brake pressure modulator 29, is output by the safety valve 8 at the brake pressure port 2.

The brake pressure modulator 29 also has a pressure supply port 35 that is connected to the supply pressure vessel 9 by a pneumatic line. The brake pressure modulator 29 is controlled by control device 42 via electrical connections.

The pneumatic brake pressure modulator 29 is embodied in a known fashion as a two-channel pressure control module. A common 3/2-way solenoid valve is provided here as a switching valve for further channel-specific ventilation and venting solenoid valves that, for the case of EBS brake pressure control with a clocking mode of operation, modulate pilot brake pressures for each channel, which pilot brake pressures are in turn applied to control inlets of relay valves that are provided for each channel. The relay valve working ports are connected to the cylinder brake lines 36 for the brake cylinders 38 and 39, which are arranged on the left side of the vehicle in the direction of travel, and to the cylinder brake lines 37 for the brake cylinders 40 and 41, which are arranged on the right side of the vehicle in the direction of travel.

In this way, load-dependent distribution of the braking force is also performed in the scope of EBS pressure control operation. A semitrailer with air spring bellows 45 on the left side of the vehicle and 46 on the right side are used as the basis for this, the air spring bellows 46 on the right side being provided with a pressure sensor whose measured pressure value is made available to the control device 42. The control device 42 modifies the modulated brake pressures as a function of the load by using this measured pressure value, which represents the load of the vehicle.

The control device 42 also uses the measured pressure value of the pressure sensor 47 for the EBS brake pressure control operation, the measured pressure value constituting the brake pressure of the safety valve 8, which is output at the brake pressure port 2. This measured pressure value is provided for the case of a conventional towing vehicle 100 in which the control device 42 uses the electrical measured pressure value as an electrical brake request signal for the EBS brake pressure control operation.

For the sake of completeness, it is also to be noted that the ABS brake control operation can also be carried out by the devices of the EBS brake pressure control system. For this purpose, in accordance with FIG. 1, an ABS sensor 43 is provided on the left wheel of the brake cylinder 39 and an ABS sensor 44 is provided on the wheel of the right brake cylinder 40.

The braking system of the towing vehicle 100 has respective brake cylinders 101, 104 for activating the brakes of the rear axle, and respective brake cylinders 102, 103 for activating the brakes of the front axle.

Furthermore, ABS sensors 105, 106, 107, 108 are provided for sensing the rotational speeds of the vehicle wheels. The ABS sensors 105, 106, 107, 108 are connected to an electrical brake control system 109 via electrical lines. The control system 109 has electronics for evaluating the sensor signals and for actuating pneumatic valves, which are also components of the control system 109. The valves of the brake control system 109 are connected via pneumatic lines to the brake cylinders 101, 102, 103, 104. The electronic controller of the brake control system 109 carries out automatic adjustment and control of the brake pressures in the brake cylinders 101, 102, 103, 104 in accordance with a brake activation request by the vehicle driver, determined by means of a brake value signal transmitter 110, and by evaluating the signals of the ABS sensors 105, 106, 107, 108. Furthermore, the brake control system 109 controls the trailer brake valve 113 and a compressed air-generating system 112. The compressed air-generating system 112 has, inter alia, a compressor and a separate electronic controller that controls the compressor in accordance with the compressed air requirement such that a sufficient compressed air supply is kept at all times in a compressed air supply vessel 111 connected to the compressed air-generating system 112. The compressed air supply vessel 111 is connected to the red coupling head 48 via the brake pressure hose 30.

Figure 2:
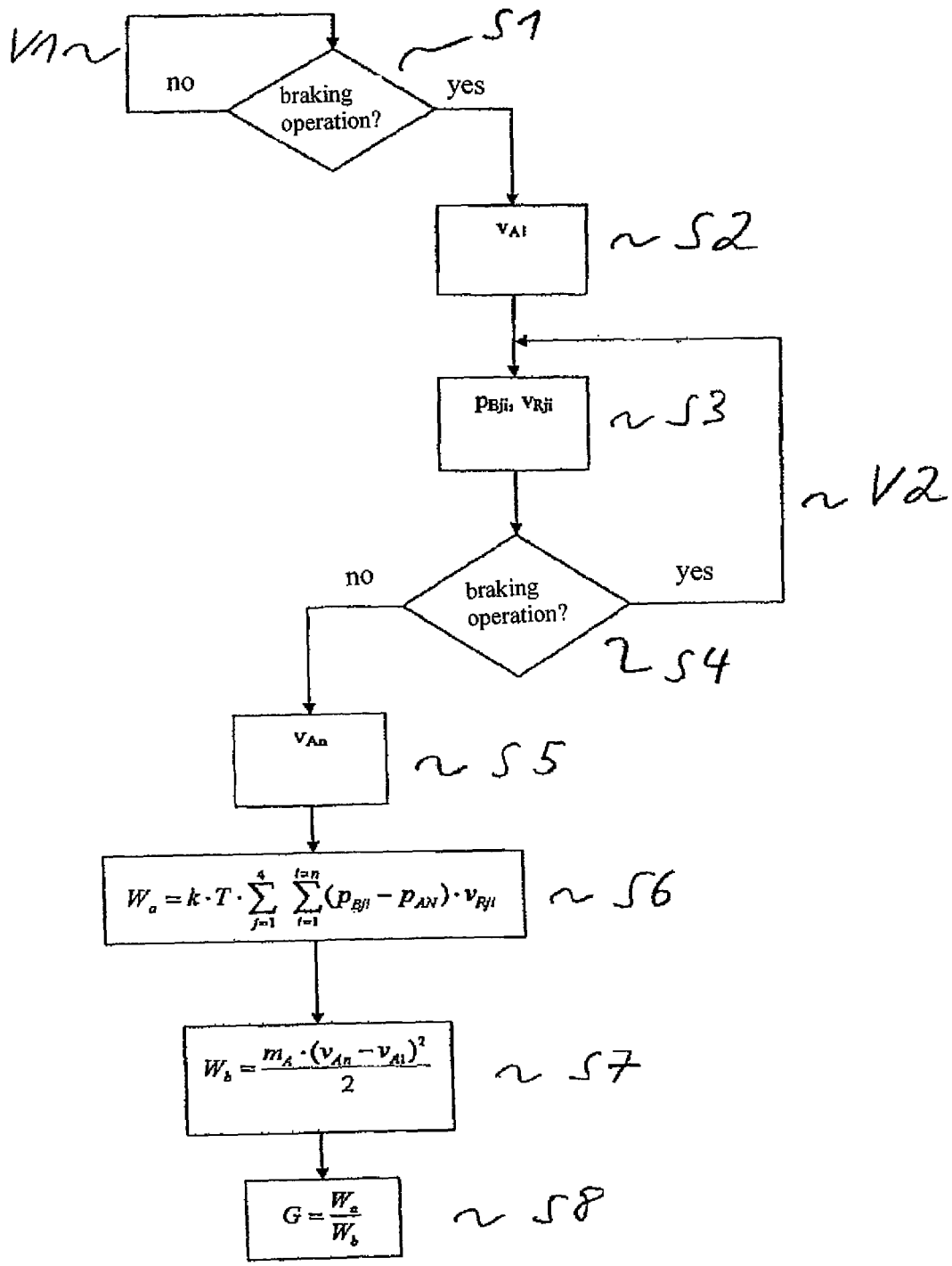
FIG. 2 shows a flow chart of a method according to a preferred embodiment of the present invention for determining the variable for assessing the compatibility of the braking systems.

In the following discussion, it is assumed that the method described below for determining a variable for assessing the compatibility of the braking systems is carried out in the control device 42 of the trailer vehicle 50. FIG. 2 illustrates, as a flow chart, an embodiment of the method according to the invention for determining a variable for assessing the compatibility of the braking systems of the vehicle combination shown in FIG. 1. At the start of the method, a test is effected in a step S1 to determine whether a braking process is occurring. For example, the activation of the brake pedal 110 is used as a criterion for the occurrence of a braking process. If no braking process is occurring, a test to determine whether a braking process is occurring according to step S1 is carried out by means of a branching operation V1. If a braking process is detected, in a step S2 the speed $v_{AI}$ of the trailer vehicle 50 at the start of the braking process is determined and the speed $v_{AI}$ is stored in a memory of the control device 42. The speed $v_{aI}$ is understood to be the speed of the trailer vehicle 50 in the direction of the longitudinal axis of the trailer vehicle 50. The speed $v_{AI}$ can be determined, for example, by means of a speedometer in the towing vehicle 100 or by means of the signals of the ABS sensors 44, 46.

In a subsequent step S3, the brake pressures $p_{Bji}$, which occur in the brake cylinders 38-41, and the wheel circumferential speeds $v_{Rji}$ of the wheels 51-54, which are braked by the brake cylinders 38-41, are determined and are stored in the memory of the control device 42. Here, j and i are indices. The index j represents the index for the respective brake cylinder and wheel, which is braked by the brake cylinder 38-41. The index i indicates the relevant sampling time period of a sampling time T of the control device 42 for the determination of $p_{Bji}$ and $v_{Rji}$. That is, in the step S3, the brake pressures $p_{Bji}$ in all the brake cylinders 38-41 of the trailer vehicle 50, and the wheel circumferential speeds $v_{Rji}$ of the associated wheels 51-54, are determined.

The brake pressures $p_{Bji}$ can be determined, for example, by means of the pneumatic control pressure predefined by the towing vehicle 100 or by means of the signals of pressure sensors (not shown in FIG. 1) in the modulator 29. The wheel circumferential speeds $v_{Rji}$ can be determined, for example, by means of the signals of the ABS sensors 43, 44.

In a subsequent step S4, a test is effected for determining whether the braking process continues. The testing can be carried out, for example, by means of the activation of the brake pedal 110. If the braking process continues, reference is made to the step S3 in a branching operation V2, and in the step S3 the brake pressures $p_{Bji}$, which occur in the brake cylinders 38-41, and the circumferential speeds $v_{Rji}$ of the wheels 51-54, which are braked by the brake cylinders 38-41 are determined and stored in the memory of the control device 42. The branching operation V2 ensures that the brake pressures $p_{Bji}$ and the wheel circumferential speeds $v_{Rji}$ are determined and stored for each sampling time period occurring during the braking process.

If the braking process does not continue any more, in a step S5 a speed $v_{An}$ of the trailer vehicle 50 is determined after the braking process has ended, and the speed $v_{An}$ is stored in the memory of the control device 42. The speed $v_{An}$ is understood to be the speed of the trailer vehicle 50 in the direction of the longitudinal axis of the trailer vehicle 50. The speed $v_{An}$ can, for example, be determined by means of a speedometer in the towing vehicle 100 or by means of the signals of the ABS sensors 43, 44.

Then, in a step S6, the applied amount of braking energy $W_a$ is determined in accordance with the formula specified in S6, where k denotes a constant, T denotes a sampling time of the control device 42 and $p_{AN}$ denotes an application pressure. The application pressure $p_{AN}$ is the pressure necessary in a brake cylinder 48-41 for applying the brake linings to a disk or drum without contact occurring between the brake linings and the disk or drum. It is usually approximately 0.5 bar. The applied amount of braking energy $W_a$ is determined by means of two sums: on the one hand, the sum of i=1 to i=n over the various sampling time periods, where n denotes the number of sampling time periods occurring during the braking process; on the other hand, the sum over all the brake cylinders 38-41 in the trailer vehicle 50.

As described above, the constant k can be determined by the formula:

$$k = \frac{m_{AbB} \cdot 0.55 \cdot g}{p_{max} - p_{AN}},$$

where $m_{AbB}$ is the mass to be braked by a brake cylinder 38-41 of the fully laden trailer vehicle 50; g is the gravitational constant; $p_{AN}$ is the application pressure; and $p_{max}$ is the pressure in a brake cylinder 38-41 given a control pressure of 6.5 bar.

In a subsequent step S7, the required amount of braking energy $W_b$ is determined by means of the formula specified in S7, where $m_A$ denotes the mass of the trailer vehicle 50. In a step S8, the variable G for assessing the compatibility of the braking systems of the vehicle combination is finally determined by means of the quotient formed from $W_a$ and $W_b$. If the variable G is less than 1, the trailer vehicle 50 is underbraked, since the actually applied amount of braking energy $W_a$ is less than the theoretically required amount of braking energy $W_b$. If the variable G is greater than 1, the trailer vehicle 50 is overbraked, since the amount of braking energy $W_a$ actually applied is greater than the theoretically required amount of braking energy $W_b$. In an ideal case, the variable G assumes the value one.

The determination of the applied amount of braking energy $W_a$ and the required amount of braking energy $W_b$ and the determination of the variable G are carried out automatically by means of algorithms stored in the control device 42.

In the exemplary embodiment presented, the applied amount of braking energy $W_a$ and the required amount of braking energy $W_b$ and/or the variable G are determined during the normal driving mode of the vehicle combination. Thus, a brake test bench is not required for the determination.

As indicated above, the variable G can be determined on the basis of the applied amounts of braking energy $W_a$, which are determined for a plurality of braking processes, and the required amounts of braking energy $W_b$, which are determined for the plurality of braking processes, for example by the formation of mean values. The values for the amounts of braking energy determined in the individual braking processes can, for this purpose, be stored in a memory of the control device 42, permitting statistical analysis of the sensed and stored values, which means that more informative and more accurate results can be determined for the variable G.

Also, as indicated above, the variable G can be output, for example, visually or audibly. This can be accomplished, for example, on a display provided in the dashboard of the vehicle combination; also, a warning lamp can automatically switch on when variables G are determined that are outside a desired value range. The variable G can also be read out/displayed via a diagnostic device connected to the control device 42.

Additionally, as indicated above, the applied amount of braking energy $W_a$ and the required amount of braking energy $W_b$ and the variable G can be transmitted to a receiver unit via a telematics interface, for example, during the normal driving mode of the vehicle combination, via a wireless data connection.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for assessing the compatibility of braking systems of a vehicle combination having a towing vehicle and a trailer vehicle, said vehicle combination including a suitably programmed control device having a memory, the method comprising the steps of (i) determining, utilizing said control device, an applied amount of braking energy from a start of a braking process of said trailer vehicle to an end of said braking process, (ii) determining, utilizing said control device, a required amount of braking energy from said start of said braking process to said end of said braking process, (iii) determining, utilizing said control device, a variable that is both a function of and a quotient formed from each of said applied amount of braking energy and said required amount of braking energy, and (iv) adjusting said braking systems of said vehicle combination based on said variable, wherein said determining of said applied amount of braking energy comprises detecting an applied braking pressure in a brake cylinder of said trailer vehicle.

2. The method as claimed in claim 1, wherein said applied amount of braking energy is a function of at least one wheel circumferential speed of a wheel of said trailer vehicle and at least one brake cylinder pressure of a brake cylinder of said trailer vehicle.

3. The method as claimed in claim 1, wherein said step of determining said applied amount of braking energy includes calculating said applied amount of braking energy according to the relationship:

$$W_{aj} = k \cdot T \cdot \sum_{i=1}^{n} (p_{Bji} - p_{AN}) \cdot v_{Rji}$$

Where:
Waj is the amount of braking energy applied by the brake cylinder of the trailer vehicle to brake a trailer wheel;
k is a constant;
T is a sampling time of the control device;
pBji is the pressure in the brake cylinder;
pAN is an application pressure; and
vRji is a circumferential speed of the wheel braked by the brake cylinder.

4. The method as claimed in claim 1, wherein said variable is a function of said applied amount of braking energy for a plurality of braking processes, and said required amount of braking energy for said plurality of braking processes.

5. The method as claimed in claim 1, further comprising the step of outputting said variable.

6. The method as claimed in claim 1, further comprising the step of transmitting at least one of (i) said applied amount of braking energy and said required amount of braking energy and (ii) said variable to a receiver unit by means of a telematics interface.

7. The method as claimed in claim 1, wherein at least one of (i) said steps of determining said applied amount of braking energy and said required amount of braking energy and (ii) said step of determining said variable is effected during a normal driving mode of said vehicle combination.

8. The method as claimed in claim 1, wherein at least one of (i) said steps of determining said applied amount of braking energy and said required amount of braking energy and (ii) said step of determining said variable is effected automatically.

9. The method as claimed in claim 1, wherein said step of determining said variable excludes a braking process on a roadway having a longitudinal inclination in excess of a predefined limiting value.

10. The method as claimed in claim 9, further comprising the step of detecting said braking process on a roadway having a longitudinal inclination in excess of a predefined limiting value based on a speed gradient sensed before said braking process.

11. The method as claimed in claim 1, further comprising the step of adjusting said braking systems of said vehicle combination as a function of said variable.

12. The method as claimed in claim 1, further comprising the steps of storing said applied amount of braking energy and said required amount of braking energy in said control device, and presenting said applied amount of braking energy and said required amount of braking energy via an interface.

13. A method for assessing the compatibility of braking systems of a vehicle combination having a towing vehicle and a trailer vehicle, said vehicle combination including a suitably programmed control device having a memory, the method comprising the steps of (i) determining, utilizing said control device, an applied amount of braking energy of a braking process of said trailer vehicle, (ii) determining, utilizing said control device, a required amount of braking energy of said braking process of said trailer vehicle, (iii) determining, utilizing said control device, a variable that is both a function of and a quotient formed from each of said applied amount of braking energy and said required amount of braking energy, and (iv) adjusting said braking systems of said vehicle combination based on said variable, wherein said step of determining said required amount of braking energy includes calculating said required amount of braking energy according to the relationship:

$$W_b = \frac{m_A \cdot (v_{An} - v_{A1})^2}{2}$$

Where:
Wb is the required amount of braking energy;
mA is the mass of the trailer vehicle;
vAl is the speed of the trailer vehicle at the start of the braking process; and
vAn is the speed of the trailer vehicle after the end of the braking process.

14. A control device suitably programmed to effect a method for assessing the compatibility of braking systems of a vehicle combination having a towing vehicle and a trailer vehicle, the method comprising the steps of (i) determining, utilizing said control device, an applied amount of braking energy from a start of a braking process of said trailer vehicle to an end of said braking process, (ii) determining, utilizing said control device, a required amount of braking energy from said start of said braking process to said end of said braking process, (iii) determining, utilizing said control device, a variable that is both a function of and a quotient formed from each of said applied amount of braking energy and said required amount of braking energy, and (iv) adjusting said braking systems of said vehicle combination based on said variable, wherein said determining of said applied amount of braking energy comprises detecting an applied braking pressure in a brake cylinder of said trailer vehicle.

15. A method for assessing the compatibility of braking systems of a vehicle combination having a towing vehicle and a trailer, said vehicle combination including a suitably programmed control device having a memory, the method comprising the steps of:
when said vehicle combination is being braked, determining braked trailer speed at the start of braking, and storing said braked trailer speed in said control device; determining brake pressures in trailer brake cylinders and wheel speeds of trailer wheels braked by said trailer brake cylinders, and storing said brake pressures and wheel speeds in said control device;
when said vehicle combination is no longer being braked, determining unbraked trailer speed, and storing said unbraked trailer speed in said control device;
utilizing said control device, calculating an applied amount of braking energy Waj according to the relationship:

$$W_{aj} = k \cdot T \cdot \sum_{i=1}^{n} (p_{Bji} - P_{AN}) \cdot v_{Rji}$$

Where:
k is a constant,
T is a sampling time of the control device,
pBji is the pressure in the brake cylinder,
pAN is an application pressure, and
vRji is the circumferential speed of the braked trailer wheel;
utilizing said control device, calculating a required amount of braking energy Wb according to the relationship:

$$W_b = \frac{m_A \cdot (v_{An} - v_{A1})^2}{2}$$

Where:
mA is the mass of the trailer vehicle,
vAl is the speed of the trailer at the start of the braking process, and
vAn is the speed of the trailer after the end of the braking process;
utilizing said control device, determining a variable as both a function of and a quotient formed from said applied amount of braking energy and said required amount of braking energy; and
adjusting said braking systems of said vehicle combination based on said variable.

16. A control device suitably programmed to effect a method for assessing the compatibility of braking systems of a vehicle combination having a towing vehicle and a trailer, the method comprising the steps of:
  when said vehicle combination is being braked, determining braked trailer speed at the start of braking, and storing said braked trailer speed in said control device; determining brake pressures in trailer brake cylinders and wheel speeds of trailer wheels braked by said trailer brake cylinders, and storing said brake pressures and wheel speeds in said control device;
  when said vehicle combination is no longer being braked, determining unbraked trailer speed, and storing said unbraked trailer speed in said control device;
  utilizing said control device, calculating an applied amount of braking energy Waj according to the relationship:

$$W_{aj} = k \cdot T \cdot \sum_{i=1}^{n} (p_{Bji} - P_{AN}) \cdot v_{Rji}$$

Where:
k is a constant,
T is a sampling time of the control device,
pBji is the pressure in the brake cylinder,
pAN is an application pressure, and
vRji is the circumferential speed of the braked trailer wheel;
  utilizing said control device, calculating a required amount of braking energy Wb according to the relationship:

$$W_b = \frac{m_A \cdot (v_{An} - v_{A1})^2}{2}$$

Where:
mA is the mass of the trailer vehicle,
vAl is the speed of the trailer at the start of the braking process, and
vAn is the speed of the trailer after the end of the braking process;
  utilizing said control device, determining a variable as both a function of and a quotient formed from said applied amount of braking energy and said required amount of braking energy; and
  adjusting said braking systems of said vehicle combination based on said variable.

* * * * *

UNITED STATES PATENT AND TRADEMARK OFFICE
CERTIFICATE OF CORRECTION

PATENT NO. : 8,543,305 B2  Page 1 of 1
APPLICATION NO. : 12/451686
DATED : September 24, 2013
INVENTOR(S) : Heise et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 773 days.

Signed and Sealed this

Fifteenth Day of September, 2015

Michelle K. Lee
*Director of the United States Patent and Trademark Office*